(12) United States Patent
Kweon et al.

(10) Patent No.: US 7,100,778 B2
(45) Date of Patent: Sep. 5, 2006

(54) CLEANING JIG

(75) Inventors: Hyug Jin Kweon, Kumi-shi (KR); Hae Joon Son, Kyongsangbuk-do (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 193 days.

(21) Appl. No.: 10/301,597

(22) Filed: Nov. 22, 2002

(65) Prior Publication Data

US 2003/0230544 A1 Dec. 18, 2003

(30) Foreign Application Priority Data

Jun. 14, 2002 (KR) .................................. 2002-0033266

(51) Int. Cl.
*A47B 73/00* (2006.01)
*A47F 1/04* (2006.01)

(52) U.S. Cl. ........................................ 211/74; 211/60.1

(58) Field of Classification Search ................. 422/104; 211/74, 60.1, 69
See application file for complete search history.

(56) References Cited

U.S. PATENT DOCUMENTS

| | | | | |
|---|---|---|---|---|
| 1,054,035 A | * | 2/1913 | Ruhnay | 211/74 |
| 3,978,580 A | | 9/1976 | Leupp et al. | |
| 4,090,612 A | * | 5/1978 | Lostutter | 211/60.1 |
| 4,094,058 A | | 6/1978 | Yasutake et al. | |
| 4,653,864 A | | 3/1987 | Baron et al. | |
| 4,691,995 A | | 9/1987 | Yamazaki et al. | |
| 4,718,441 A | * | 1/1988 | Daum et al. | 134/201 |
| 4,775,225 A | | 10/1988 | Tsuboyama et al. | |
| 5,005,721 A | * | 4/1991 | Jordan | 220/23.4 |
| 5,084,251 A | * | 1/1992 | Thomas | 422/300 |
| 5,169,603 A | * | 12/1992 | Landsberger | 211/74 |
| 5,217,694 A | * | 6/1993 | Gibler et al. | 422/104 |
| 5,247,377 A | | 9/1993 | Omeis et al. | |
| 5,263,888 A | | 11/1993 | Ishihara et al. | |
| 5,322,668 A | * | 6/1994 | Tomasso | 211/74 |

(Continued)

FOREIGN PATENT DOCUMENTS

| | | |
|---|---|---|
| EP | 1003066 | 5/2000 |
| EP | 1 003 066 A1 | 5/2000 |
| JP | H08-136937 | 5/1899 |
| JP | 51-65656 | 6/1976 |
| JP | 51065656 | 6/1976 |
| JP | 57-038414 | 3/1982 |
| JP | 57038414 | 3/1982 |
| JP | 57-088428 | 6/1982 |
| JP | 58-027126 | 2/1983 |
| JP | 59-057221 | 4/1984 |
| JP | 59057221 | 4/1984 |
| JP | 59-195222 | 11/1984 |
| JP | 59195222 | 11/1984 |
| JP | 60-111221 | 6/1985 |
| JP | 60111221 | 6/1985 |
| JP | 60164723 | 8/1985 |
| JP | 60-164723 | 8/1985 |
| JP | 60-217343 | 10/1985 |
| JP | 60217343 | 10/1985 |
| JP | 61-007822 | 1/1986 |

(Continued)

*Primary Examiner*—Hugh B. Thompson, II
(74) *Attorney, Agent, or Firm*—McKenna Long & Aldridge LLP

(57) ABSTRACT

A cleaning jig for cleaning a plurality of liquid crystal containers includes a first fixing part provided with first holes within which flanges are arranged, a supporting die made, and a second fixing part for being coupled with the supporting die, arranged over the first fixing part, and including second holes arranged in correspondence with the first holes.

19 Claims, 4 Drawing Sheets

U.S. PATENT DOCUMENTS

| | | | |
|---|---|---|---|
| 5,379,139 A | 1/1995 | Sato et al. | |
| D355,337 S * | 2/1995 | Eisenbraun et al. | D7/620 |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,616,301 A * | 4/1997 | Moser et al. | 422/104 |
| 5,642,214 A | 6/1997 | Ishii et al. | |
| 5,680,189 A | 10/1997 | Shimizu et al. | |
| 5,725,109 A * | 3/1998 | Moulton et al. | 211/73 |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,062,398 A * | 5/2000 | Thalmayr | 211/74 |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,251,686 B1 * | 6/2001 | Studer et al. | 436/180 |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,345,723 B1 * | 2/2002 | Blake et al. | 211/74 |
| 6,395,234 B1 * | 5/2002 | Hunnell et al. | 422/101 |
| 6,414,733 B1 | 7/2002 | Ishikawa et al. | |
| 6,533,133 B1 * | 3/2003 | Liu | 211/74 |
| 6,568,544 B1 * | 5/2003 | Lafond et al. | 211/74 |
| 2001/0002100 A1 | 5/2001 | Compton et al. | |
| 2002/0108917 A1 * | 8/2002 | Maruyama | 211/74 |

FOREIGN PATENT DOCUMENTS

| | | |
|---|---|---|
| JP | 61007822 | 1/1986 |
| JP | 61055625 | 3/1986 |
| JP | 61-055625 | 3/1986 |
| JP | S62-054225 | 3/1987 |
| JP | S62-054228 | 3/1987 |
| JP | 62-089025 | 4/1987 |
| JP | 62089025 | 4/1987 |
| JP | 62-090622 | 4/1987 |
| JP | 62090622 | 4/1987 |
| JP | 62205319 | 9/1987 |
| JP | 62-205319 | 9/1987 |
| JP | 10123537 | 5/1988 |
| JP | 63109413 | 5/1988 |
| JP | 63-109413 | 5/1988 |
| JP | 63-110425 | 5/1988 |
| JP | 63110425 | 5/1988 |
| JP | 63128315 | 5/1988 |
| JP | 63-128315 | 5/1988 |
| JP | 63311233 | 12/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05127179 | 5/1993 |
| JP | 05-127179 | 5/1993 |
| JP | 05154923 | 6/1993 |
| JP | 5154923 | 6/1993 |
| JP | 05-265011 | 10/1993 |
| JP | 05265011 | 10/1993 |
| JP | 05281557 | 10/1993 |
| JP | 05-281557 | 10/1993 |
| JP | 05-281562 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06148657 | 5/1994 |
| JP | 06-148657 | 5/1994 |
| JP | 03-160871 | 6/1994 |
| JP | H06-194637 | 7/1994 |
| JP | 6235925 | 8/1994 |
| JP | 06-235925 | 8/1994 |
| JP | 06265915 | 9/1994 |
| JP | 06-265915 | 9/1994 |
| JP | 6313870 | 11/1994 |
| JP | 06-313870 | 11/1994 |
| JP | 07-084268 | 3/1995 |
| JP | 7084268 | 3/1995 |
| JP | 07128674 | 5/1995 |
| JP | 07-128674 | 5/1995 |
| JP | 07181507 | 7/1995 |
| JP | 07-181507 | 7/1995 |
| JP | H07-275 | 10/1995 |
| JP | H07-275770 | 10/1995 |
| JP | H08-076133 | 3/1996 |
| JP | 08-10601 | 4/1996 |
| JP | 08095066 | 4/1996 |
| JP | 08-095066 | 4/1996 |
| JP | 08-101395 | 4/1996 |
| JP | 8101395 | 4/1996 |
| JP | 08106101 | 4/1996 |
| JP | H08-110504 | 4/1996 |
| JP | 08-171094 | 7/1996 |
| JP | 08171094 | 7/1996 |
| JP | H08-173874 | 7/1996 |
| JP | 08190099 | 7/1996 |
| JP | 08-190099 | 7/1996 |
| JP | 08240807 | 9/1996 |
| JP | 08-240807 | 9/1996 |
| JP | H09-001026 | 1/1997 |
| JP | 09005762 | 1/1997 |
| JP | 09-005762 | 1/1997 |
| JP | 09026578 | 1/1997 |
| JP | 09-026578 | 1/1997 |
| JP | 09-311340 | 2/1997 |
| JP | 09-61829 | 3/1997 |
| JP | 9061829 | 3/1997 |
| JP | 09-073075 | 3/1997 |
| JP | 09073075 | 3/1997 |
| JP | 09-073096 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 1042616 | 5/1998 |
| JP | 10-123537 | 5/1998 |
| JP | 10123538 | 5/1998 |
| JP | 10-123538 | 5/1998 |
| JP | 10142616 | 5/1998 |
| JP | H10-174924 | 6/1998 |

| | | | | | |
|---|---|---|---|---|---|
| JP | 10177178 | 6/1998 | JP | 2001-066615 | 3/2001 |
| JP | 10-177178 | 6/1998 | JP | 2001066615 | 3/2001 |
| JP | H11-174294 | 6/1998 | JP | 2001-091727 | 4/2001 |
| JP | 10221700 | 8/1998 | JP | 2001091727 | 4/2001 |
| JP | 10-282512 | 10/1998 | JP | 2001117105 | 4/2001 |
| JP | 10282512 | 10/1998 | JP | 2001-117105 | 4/2001 |
| JP | 10-333157 | 12/1998 | JP | 2001-117109 | 4/2001 |
| JP | 10333157 | 12/1998 | JP | 2001117109 | 4/2001 |
| JP | 10333159 | 12/1998 | JP | 2001133745 | 5/2001 |
| JP | 11014953 | 1/1999 | JP | 2001-133794 | 5/2001 |
| JP | 11-014953 | 1/1999 | JP | 2001133794 | 5/2001 |
| JP | 11-038424 | 2/1999 | JP | 2001-133799 | 5/2001 |
| JP | 11038424 | 2/1999 | JP | 2001133799 | 5/2001 |
| JP | 11064811 | 3/1999 | JP | 2001142074 | 5/2001 |
| JP | 11-109388 | 4/1999 | JP | 2001-142074 | 5/2001 |
| JP | 11109388 | 4/1999 | JP | 2001147437 | 5/2001 |
| JP | 11-133438 | 5/1999 | JP | 2001-147437 | 5/2001 |
| JP | 11133438 | 5/1999 | JP | 2001-733745 | 5/2001 |
| JP | 11142864 | 5/1999 | JP | 2001-154211 | 6/2001 |
| JP | 11-142864 | 5/1999 | JP | 2001154211 | 6/2001 |
| JP | 11174477 | 7/1999 | JP | 2001-166272 | 6/2001 |
| JP | 11-174477 | 7/1999 | JP | 2001166272 | 6/2001 |
| JP | 11212045 | 8/1999 | JP | 2001-166310 | 6/2001 |
| JP | 11-212045 | 8/1999 | JP | 2001166310 | 6/2001 |
| JP | 11-248930 | 9/1999 | JP | 2001-183683 | 7/2001 |
| JP | 11248930 | 9/1999 | JP | 2001183683 | 7/2001 |
| JP | H11-262712 | 9/1999 | JP | 2001-201750 | 7/2001 |
| JP | H11-264991 | 9/1999 | JP | 2001-208057 | 8/2001 |
| JP | 11-326922 | 11/1999 | JP | 2001209052 | 8/2001 |
| JP | 11326922 | 11/1999 | JP | 2001-209052 | 8/2001 |
| JP | 11-344714 | 12/1999 | JP | 2001-209056 | 8/2001 |
| JP | 11344714 | 12/1999 | JP | 2001-209058 | 8/2001 |
| JP | 2000002879 | 1/2000 | JP | 2001-209060 | 8/2001 |
| JP | 2000-002879 | 1/2000 | JP | 2001209060 | 8/2001 |
| JP | 2000029035 | 1/2000 | JP | 2001-215459 | 8/2001 |
| JP | 2000-029035 | 1/2000 | JP | 2001222017 | 8/2001 |
| JP | 2000-056311 | 2/2000 | JP | 2001-222017 | 8/2001 |
| JP | 20000056311 | 2/2000 | JP | 2001235758 | 8/2001 |
| JP | 2000-066165 | 3/2000 | JP | 2001-235758 | 8/2001 |
| JP | 2000-066218 | 3/2000 | JP | 2001021000 | 9/2001 |
| JP | 20000066165 | 3/2000 | JP | 2001255542 | 9/2001 |
| JP | 2000-093866 | 4/2000 | JP | 2001-255542 | 9/2001 |
| JP | 2000137235 | 5/2000 | JP | 2001-264782 | 9/2001 |
| JP | 2000-137235 | 5/2000 | JP | 2001264782 | 9/2001 |
| JP | 2000-147258 | 5/2000 | JP | 2001026347 | 10/2001 |
| JP | 2000193988 | 7/2000 | JP | 2001026348 | 10/2001 |
| JP | 2000-193988 | 7/2000 | JP | 2001272640 | 10/2001 |
| JP | 2000241824 | 9/2000 | JP | 2001-272640 | 10/2001 |
| JP | 2000-241824 | 9/2000 | JP | 2001281675 | 10/2001 |
| JP | 2000-284295 | 10/2000 | JP | 2001-281678 | 10/2001 |
| JP | 2000284295 | 10/2000 | JP | 2001-281765 | 10/2001 |
| JP | 2000292799 | 10/2000 | JP | 2001282126 | 10/2001 |
| JP | 2000-292799 | 10/2000 | JP | 2001-282126 | 10/2001 |
| JP | 2000310759 | 11/2000 | JP | 2001-305563 | 10/2001 |
| JP | 2000-310759 | 11/2000 | JP | 2001305563 | 10/2001 |
| JP | 2000310784 | 11/2000 | JP | 2001330837 | 11/2001 |
| JP | 2000-310784 | 11/2000 | JP | 2001-330837 | 11/2001 |
| JP | 2000338501 | 12/2000 | JP | 2001-330840 | 11/2001 |
| JP | 2000-338501 | 12/2000 | JP | 2001330840 | 11/2001 |
| JP | 2001-005401 | 1/2001 | JP | 2001-356353 | 12/2001 |
| JP | 2001005401 | 1/2001 | JP | 2001356353 | 12/2001 |
| JP | 2001005405 | 1/2001 | JP | 2001356354 | 12/2001 |
| JP | 2001-005405 | 1/2001 | JP | 2001-356354 | 12/2001 |
| JP | 2001-013506 | 1/2001 | JP | 2002-014360 | 1/2002 |
| JP | 2001013506 | 1/2001 | JP | 2002014360 | 1/2002 |
| JP | 2001-033793 | 2/2001 | JP | 2002023176 | 1/2002 |
| JP | 2001033793 | 2/2001 | JP | 2002-023176 | 1/2002 |
| JP | 2001042341 | 2/2001 | JP | 2002049045 | 2/2002 |
| JP | 2001-042341 | 2/2001 | JP | 2002-049045 | 2/2002 |
| JP | 2001-051284 | 2/2001 | JP | 2002-079160 | 3/2002 |
| JP | 2001051284 | 2/2001 | JP | 2002-080321 | 3/2002 |

| | | | | | | |
|---|---|---|---|---|---|---|
| JP | 2002082340 | 3/2002 | | JP | 2002-236276 | 8/2002 |
| JP | 2002-082340 | 3/2002 | | JP | 2002-258299 | 8/2002 |
| JP | 2002090759 | 3/2002 | | JP | 2002-236292 | 9/2002 |
| JP | 2002-090760 | 3/2002 | | JP | 2002-277865 | 9/2002 |
| JP | 2002090760 | 3/2002 | | JP | 2002-277866 | 9/2002 |
| JP | 2002-0090759 | 3/2002 | | JP | 2002-287156 | 10/2002 |
| JP | 2002107740 | 4/2002 | | JP | 2002-296605 | 10/2002 |
| JP | 2002-107740 | 4/2002 | | JP | 2002-311438 | 10/2002 |
| JP | 2002-122870 | 4/2002 | | JP | 2002-311440 | 10/2002 |
| JP | 2002-122872 | 4/2002 | | JP | 2002-311442 | 10/2002 |
| JP | 2002122872 | 4/2002 | | JP | 2002-34155 | 11/2002 |
| JP | 2002-122873 | 4/2002 | | JP | 2002-323687 | 11/2002 |
| JP | 2002122873 | 4/2002 | | JP | 2002-323694 | 11/2002 |
| JP | 2002-131762 | 5/2002 | | JP | 2002-333628 | 11/2002 |
| JP | 2002-139734 | 5/2002 | | JP | 2002-333635 | 11/2002 |
| JP | 2002-156518 | 5/2002 | | JP | 2002-333843 | 11/2002 |
| JP | 2002080321 | 6/2002 | | JP | 2002-341329 | 11/2002 |
| JP | 2002-169166 | 6/2002 | | JP | 2002-341356 | 11/2002 |
| JP | 2002-169167 | 6/2002 | | JP | 2002-341357 | 11/2002 |
| JP | 2002-182222 | 6/2002 | | JP | 2002-341358 | 11/2002 |
| JP | 2002202512 | 7/2002 | | JP | 2002-341359 | 11/2002 |
| JP | 2002-202512 | 7/2002 | | JP | 2002-341362 | 11/2002 |
| JP | 2002202514 | 7/2002 | | KR | 2000-0035302 | 6/2000 |
| JP | 2002-202514 | 7/2002 | | KR | 20000035302 | 6/2000 |
| JP | 2002-214626 | 7/2002 | | | | |
| JP | 2002214626 | 7/2002 | | * cited by examiner | | |
| JP | 2002-229042 | 8/2002 | | | | |

CLEANING JIG

This application claims the benefit of the Korean Application No. P2002-033266 filed on, Jun. 14, 2002, which is hereby incorporated by reference for all purposes as if fully set forth herein. This application incorporates by reference two co-pending application, Ser. No. 10/184,096, filed on Jun. 28, 2002, entitled "SYSTEM AND METHOD FOR MANUFACTURING LIQUID CRYSTAL DISPLAY DEVICES" Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a cleaning jig, and more particularly, to a cleaning jig for cleaning a liquid crystal container.

2. Discussion of the Related Art

Generally, recent developments in the field of communications have increased the demand for various types of display devices. In response to this increased demand, numerous types of flat panel displays (e.g., liquid crystal displays (LCDs), plasma display panels (PDPs), electroluminescent displays (ELDs), vacuum fluorescent displays (VFDs), etc.) have been developed.

Owing to their high resolution, light weight, thin profile, and low power consumption, LCD devices have been widely used in mobile devices (e.g., monitors of notebook computers) as well as televisions and computer monitors.

LCD devices generally include two substrates coupled to each other and separated by injected liquid crystal material. Liquid crystal materials exhibit mid-range and long-range molecular orders. Liquid crystal materials exhibit a mid-range molecular order upon melting (i.e., transitioning from a solid phase to a liquid phase), in that the liquid crystal material can assume a phase that is neither solid nor liquid. Accordingly, liquid crystals may exhibit properties of both liquids and crystals, within predetermined temperature ranges. Liquid crystal materials exhibit optical birefringence properties of optical anisotropic crystals when they are irradiated with light or when electric or magnetic fields are applied to them.

LCD devices are manufactured using a series of processes including array formation process, color filter formation process, liquid crystal (LC) cell formation process, and module formation process.

The array formation process includes steps of deposition, photolithography, and etching to form an array of thin film transistors (TFTs) on a first substrate. The color filter formation process includes the formation of a black matrix to shield light from being transmitted through a region, other than a pixel region, in a second substrate. The color filter formation process further includes steps of forming red (R), green (G), and blue (B) filters over the entire surface of the second substrate, and forming a common electrode made of ITO (Indium Tin Oxide) on the color filters.

The LC cell formation process includes steps of forming an LCD cell by bonding the first substrate, on which the array of TFTs are formed, to the second substrate, on which the black matrix, color filters, and common electrode are formed. The bonded substrates are spaced apart a uniform distance by a cell gap. The LC cell formation process further includes injecting liquid crystal material into the cell gap.

The module formation process includes the steps of manufacturing an LCD module by providing a circuit for signal processing, electrically connecting an LCD panel with the circuit via mounting technologies, and assembling other components.

A typical LC cell formation process will now be described in greater detail.

A first cassette (not shown), housing a first plurality of first substrates, and a second cassette (not shown), housing a second plurality of second substrates, are mounted into respective ports via loaders.

Each of the first and second substrates are designed to be used in the manufacture of at least one LCD panel. A plurality of gate lines are formed at fixed intervals along a first direction on the first substrate and a plurality of data lines are formed along a second direction on the first substrate, perpendicular to the first direction. Accordingly, a plurality of pixel regions may be formed in a matrix pattern at the crossing of each of the gate and data lines. A plurality of pixel electrodes are formed at the pixel regions and a plurality of thin film transistors (TFTs). In order to prevent light leakage in regions outside the pixel regions, a black matrix layer, color filters, and common electrode are sequentially formed on the second substrate.

Next, the first substrate and the second substrate are selected from the first and second cassettes, respectively, via a robot arm that is programmed to select each of the first substrates and the second substrates one at a time.

Referring to FIG. 1, an orientation film formation process (1S) is performed wherein orientation films are deposited on each of the selected first and second substrates. The orientation films uniformly align the liquid crystal material within the cell gap. Particularly, the orientation film process (1S) is carried out by pre-cleaning each of the substrates, printing the orientation films, plasticizing the orientation films, inspecting the orientation films, and rubbing the orientation films.

After the orientation film process (1S) is completed, a gap formation process is then performed. During the gap formation process, the first and second substrates are cleaned (2S), spacers are dispensed on the first substrate so as to ensure the cell gap is uniform (3S), sealant is dispensed on the second substrate and a liquid crystal injection inlet is formed at an edge portion of each panel (4S), and the first and second substrates are pressed and bonded together (5S).

The bonded first and second substrates are then cut and processed into an LCD panel (6S).

Subsequently, liquid crystal material is injected through the liquid crystal injection inlet into the cell gap of each of the LCD panels and the liquid crystal injection inlet is then sealed (7S).

Lastly, cut surfaces of the first and second substrates are then polished, and the LCD panel is then inspected for appearance and electrical failure (8S).

The liquid crystal injection process will now be described in greater detail.

In injecting liquid crystal material, liquid crystal material is provided in a liquid crystal container, the liquid crystal container is loaded into a vacuum chamber, and pressure in the vacuum chamber is reduced, thereby creating a vacuum within the vacuum chamber so that any moisture adhered to the inner surface of the liquid crystal container or any air bubbles in the liquid crystal material are removed.

While maintaining the vacuum within the vacuum chamber, the liquid crystal injection inlet of an empty LC cell contacts, or is dipped into, the liquid crystal material in the liquid crystal container. The pressure of the vacuum chamber is then increased and, due to the pressure difference between the interior of the empty LC cell and the interior of the vacuum chamber, liquid crystal material is injected through the liquid crystal injection inlet into the cell gap.

There are, however, disadvantages to manufacturing LCD devices according to the above liquid crystal injection method.

First, the aforementioned liquid crystal injection method is a time consuming process. By performing the steps of cutting substrates into LCD panels, maintaining a vacuum within cell gap of the LCD panels, contacting the liquid crystal injection inlet with liquid crystal material, injecting liquid crystal material, a considerable amount of time is required to perform and the productivity of the process is thus reduced.

Secondly, as LCD panels get larger, liquid crystal material may not be completely injected into the cell gap.

Thirdly, the aforementioned injection process is very complex and a wide variety of considerably large injection apparatuses are required.

SUMMARY OF THE INVENTION

Accordingly, the present invention is directed to a cleaning jig that substantially obviates one or more problems due to limitations and disadvantages of the related art.

An advantage of the present invention provides a cleaning jig for cleaning a liquid crystal dropping apparatus that dispenses liquid crystal material onto a glass substrate to be used in the manufacture of at least one LCD panel.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a cleaning jig includes first fixing means provided with first holes within which flanges are arranged; a supporting die; and second fixing means, for coupling with the supporting die, arranged over the first fixing means and including second holes arranged in correspondence with the first holes.

In one aspect of the invention, a cleaning jig includes first fixing means provided with first holes within which flanges are arranged; a supporting die; coupling means provided on the supporting die; second fixing means, provided with a coupling part for coupling with the coupling means, arranged over the first fixing means, including second holes arranged in correspondence with the first holes and being rotatable in upward and downward directions; and a handle hole formed at an upper side portion of the supporting die.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

In accordance with the principles of the present invention, liquid crystal material may be introduced to the LCD panel via a liquid crystal dispensing method. The liquid crystal dispensing method forms a liquid crystal layer by dispensing liquid crystal material onto a substrate and uniformly distributing the dispensed liquid crystal material over the entire surface of the substrate by pressing the substrate. The aforementioned liquid crystal dispensing method enables the liquid crystal material to be arranged on the substrate within a short period of time so that the process of forming a liquid crystal layer in large LCD panels may be performed quickly. Since a predetermined amount of liquid crystal material is dispensed on the substrate, consumption of liquid crystal material is minimized. Accordingly, costs of manufacturing LCDs may be reduced.

Figure 2:
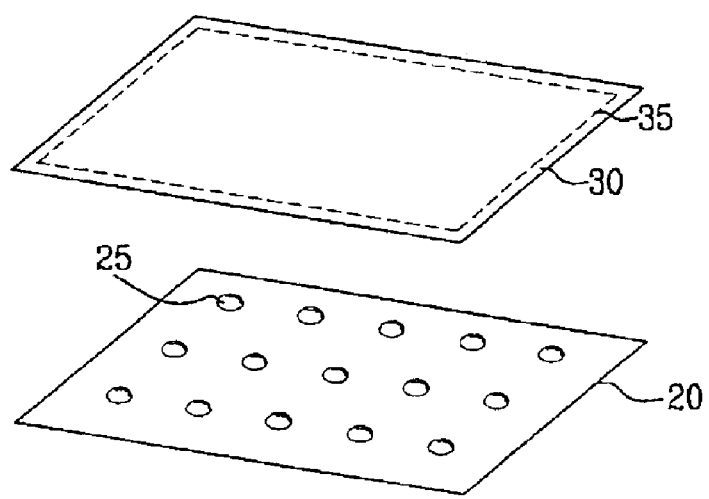
FIG. 2 illustrates a perspective view of a liquid crystal dispensing method according to the present invention.

FIG. 2 illustrates a schematic view of the liquid crystal dispensing method.

Referring to FIG. 2, the liquid crystal dispensing method may be performed prior to bonding a lower substrate (i.e., a TFT substrate) 20, on which driving elements are formed, and an upper substrate (i.e., a C/F substrate) 30, on which color filters are formed. Accordingly, liquid crystal material may be dispensed on the lower substrate 20, for example, in the form of a droplet 25. Alternatively, liquid crystal 25 may be dispensed on the upper substrate 30. During the bonding process, however, the substrate on which the liquid crystal material 25 is dispensed should be arranged such that it is located under the other substrate, wherein the liquid crystal material 25 is arranged between the two substrates.

Sealant 35 may be dispensed along edges on the upper substrate 30 to bond the upper substrate 30 to the lower substrate 20 when they are pressed together. As the upper and lower substrates 30 and 20, respectively, are pressed, the liquid crystal material 25 is spread so that a liquid crystal layer having a uniform thickness is formed between the upper substrate 30 and the lower substrate 20. Subsequently, the bonded substrates may be separated into individual LCD panels.

Figure 1:
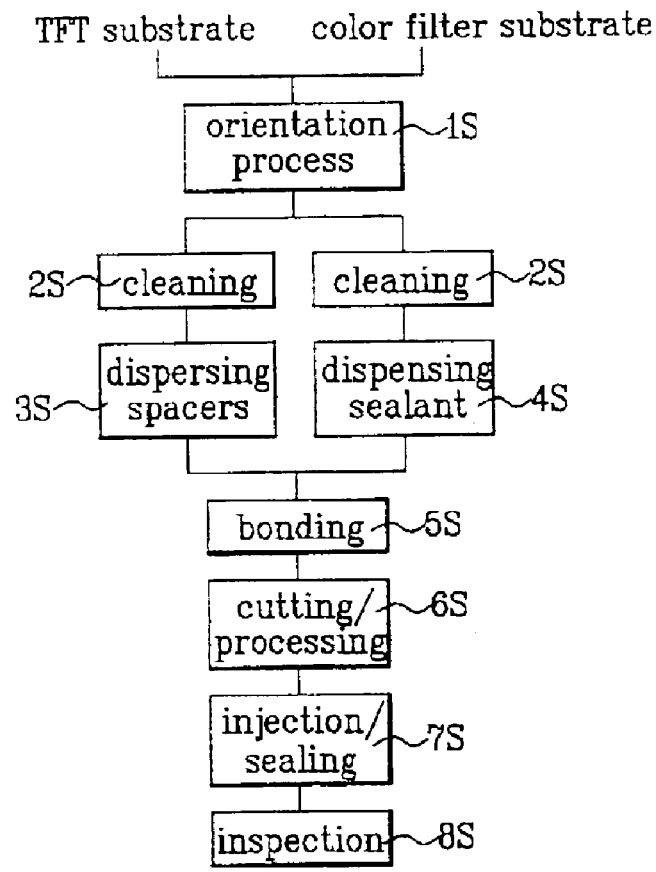
FIG. 1 illustrates a flow chart of a method for manufacturing an LCD according to a vacuum injection method.

Manufacturing LCDs according to the aforementioned liquid crystal dispensing method is advantageous over the liquid crystal injection method illustrated, for example, in FIG. 1 in that liquid crystal layers may be rapidly formed between the upper and lower substrates. Using the liquid crystal injection method, only LCD panels having the same size cell gap may be simultaneously injected with liquid crystal material under the same processing conditions (e.g., same liquid crystal container, same injection pressure, etc.). By dispensing liquid crystal material on a substrate, however, a controlled amount of liquid crystal material may be dispensed on many LCD panels having the same or different cell gaps.

The liquid crystal dispensing method includes a liquid crystal syringe provided within a liquid crystal dispensing apparatus.

A liquid crystal syringe according to an embodiment of the present invention will now be described with reference to FIG. 3.

Figure 3:
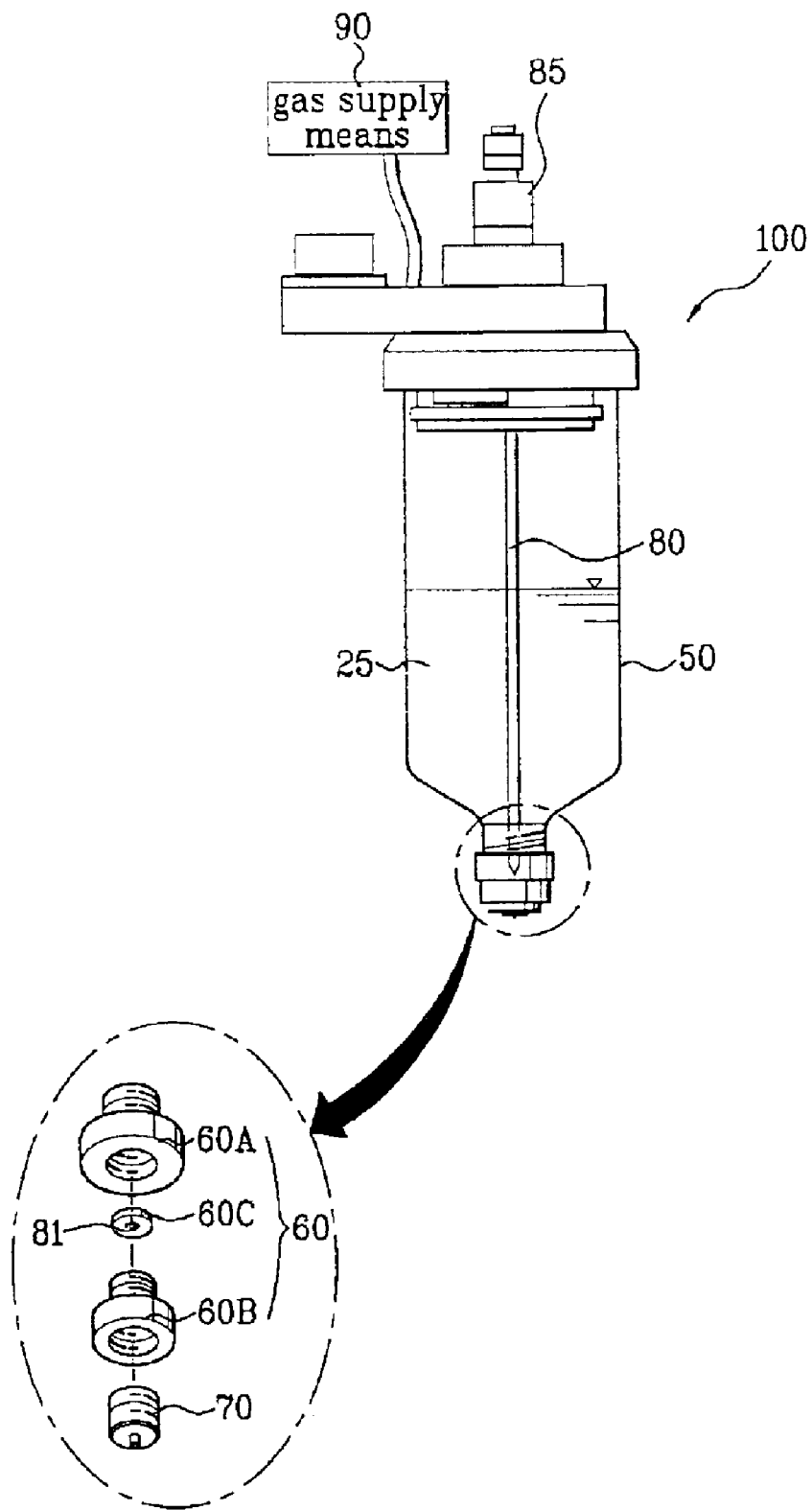
FIG. 3 illustrates a perspective view of a liquid crystal syringe according to the present invention.

Referring to FIG. 3, a liquid crystal syringe may, for example, include a liquid crystal (LC) container 50 for containing liquid crystal material 25, a dispensing regulator 60 for the dispensing liquid crystal material with the LC container 50, a nozzle 70, through which liquid crystal material exits the LC container 50, a needle for controlling the dispensing of the liquid crystal material, and a gas supply means 90 for pressurizing the LC container 50.

The dispensing regulator 60 may be coupled to the LC container 50 and include a first coupling part 60A, a second coupling part 60B, and a needle sheet 60C arranged between first and second coupling parts 60A and 60B, respectively. A first end portion of each of the first and second coupling parts 60A and 60B, respectively, may include a female screw portion and a second end portion may include a male screw portion. An exhaust hole 81 may be provided within the needle sheet 60C. The exhaust hole 81 may contact the needle 80 and function as a passage through which liquid crystal material may exit the LC container 50.

The LC container 50 may include a coupling part for coupling with the dispensing regulator 60. In one aspect of the present invention, the coupling part may include a female portion for coupling with the second end portion of the first coupling part 60A. The first end portion of the first coupling part 60A may be coupled with the second end portion of the second coupling part 60B. While the first end portion of the first coupling part 60A is coupled with the second end portion of the second coupling part 60B, the needle sheet 60C may be arranged between, and in contact with, the two coupling parts. The nozzle 70 may be coupled with the first end portion of the second coupling part 60B.

A spring (not shown) may be provided proximate needle 80. In one aspect of the present invention, the spring allows the needle 80 to contact the exhaust hole 81 and prevent the dispensing of liquid crystal material 25.

In one aspect of the present invention, a solenoid means 85 may be provided proximate the needle 80. When a magnetic force is generated by power applied to a solenoid coil (not shown), the solenoid means 85 drives the needle 80 upward. When the needle 80 is driven upward, nitrogen ($N_2$) gas, which is supplied within portions of the LC container 50 not occupied by liquid crystal material 25 through the gas supply means 90 from an external gas supply part, presses the liquid crystal material in the LC container 50 such that the liquid crystal material 25 exits the LC container 50. When the power ceases to be applied to the solenoid coil, the spring forces the needle 80 to return to its original location at the exhaust hole 81. Thus, the liquid crystal material 25 may be selectively dispensed by the upward and downward movements of the needle 80.

Figure 4:
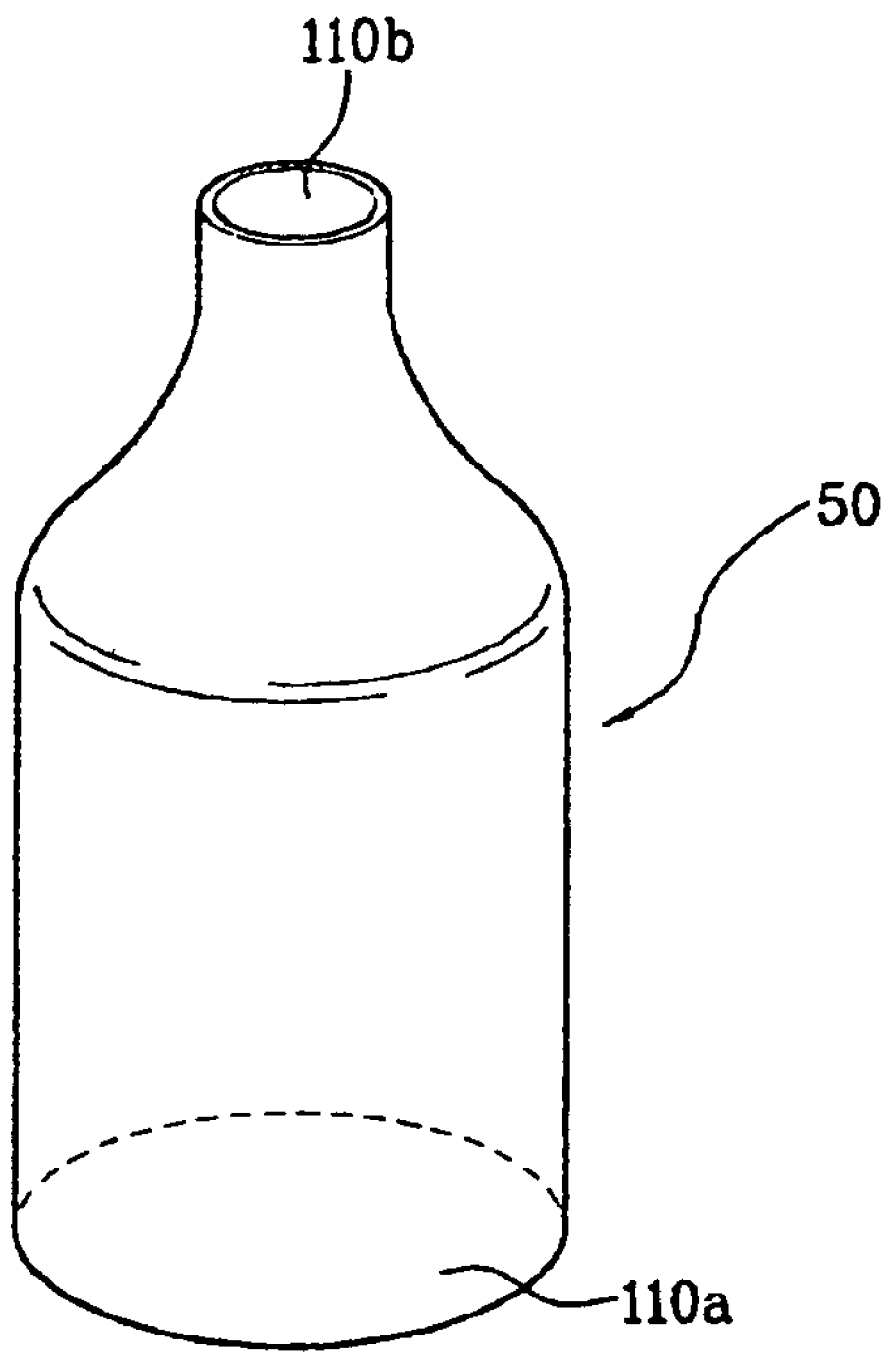
FIG. 4 illustrates a perspective view of a liquid crystal container according to the present invention.

Referring now to FIG. 4, the LC container 50 may, for example, include a first opening 110a having a predetermined perimeter, and a second opening 110b for coupling with the dispensing regulator 60 shown in FIG. 3.

According to the principles of the present invention, when the liquid crystal material 25 contained in the LC container 50 is fully discharged, the syringe 100 may be disassembled and cleaned to remove any residual liquid crystal material that remains adhered to an inner surface of the LC container 50.

In the cleaning process, a first cleaning step may include dipping the LC container 50 in an acetone solution and then a second cleaning step may include dipping the LC container 50 in an IPA (isopropyl alcohol) solution while ultra sonically vibrating the liquid crystal container 50. Subsequently, a third cleaning step, which may include dipping the LC container 50 in an IPA solution, is performed followed by blowing nitrogen ($N_2$) gas into the LC container 50 to remove any cleaning solution remaining in the LC container 50.

Figure 5:
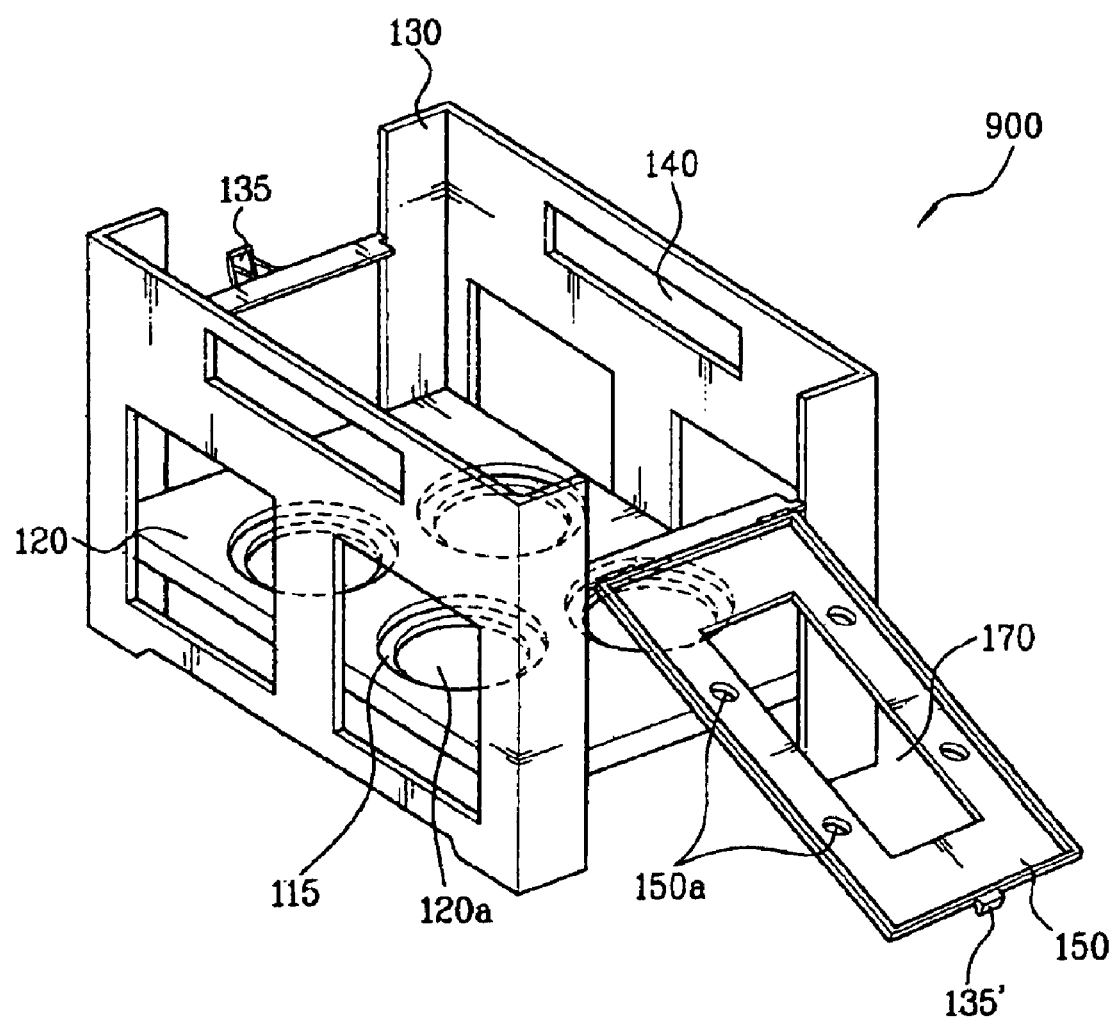
FIG. 5 illustrates a perspective view of a cleaning jig according to an embodiment of the present invention.

In one aspect of the present invention, cleaning the LC container 50 may be facilitated using a cleaning jig such as that shown in FIG. 5.

Referring to FIG. 5, the cleaning jig 900 may, for example, be provided with a first fixing means 120. The first fixing means 120 may be made of a material such as stainless steel and be provided with a plurality of first holes 120a, inside of which a flange 115 may be disposed. A peripheral part of the first opening 110a shown in FIG. 4 maybe arranged on the flange 115 so that the first opening 110a of LC container 50 may be supported. Based on the number of the plurality of first holes 120a, multiple LC containers 50 may be arranged within the first holes 120a. Cleaning solution may then be introduced between the first holes 120a to clean the interior of the LC container 50.

A supporting die 130 extending in up, down, left and right directions may be provided at side portions of the first fixing means 120. In one aspect of the present invention, the supporting die 130 may be made of a material such as stainless steel and be formed to impart the cleaning jig 900 with a minimum weight. A handle hole 140 may be formed at an upper portion of the cleaning jig 900 such that the LC container 50 may be transferred to a cleaning apparatus after being arranged in the cleaning jig 900. A coupling means 135 may be provided at an upper portion of the supporting die 130 for coupling with a second rotatable fixing means 150 to secure the LC container 50 within the cleaning jig 900.

A second fixing means 150 may be arranged over the first fixing means 120. The second fixing means 150 may, for example, include a plurality of second holes 150a arranged in correspondence with the plurality of first holes 120a and a coupling part for (135') for coupling with the coupling means 135. The second fixing means 150 may be rotatable in the upward and downward directions via a rotating means (not shown), e.g., a hinge, etc., and be selectively coupled to the coupling means 135. The second fixing means 150 may be spaced apart at a predetermined distance from the first fixing means 120. Accordingly, the predetermined distance corresponds to a distance suitable for securely fixing the LC container 50 within the cleaning jig 900 when the second fixing means 150 is selectively coupled with the coupling means 135. When the second fixing means 150 is coupled with the coupling means, a peripheral portion around the second opening 110b of the LC container may be received by the second hole 150a. In one aspect of the present invention, the second fixing means 150 may, for example, be made of a material such as stainless steel and a hole 170 hole may be formed at a center portion of the second fixing means 150 so as to impart a minimum weight to the cleaning jig 900.

Methods of cleaning LC container using the aforementioned cleaning jig will now be described.

At least one LC container 50 in which, for example, LC material 25 contained therein has been fully discharged and which is separated from a liquid crystal dropping apparatus may be arranged on one of the flanges 115 of the first fixing means 120. The second fixing means 150 may then be rotated via the rotating means and thus the second end portions 110b of the LC containers 50 may be inserted into the second holes 150a. Subsequently, the supporting die 130 may be coupled with the second fixing means 150 via the coupling means 135 so that the LC containers 50 may be securely arranged within the cleaning jig 900. Subsequently, the cleaning jig 900 may be transported to a cleaning apparatus using, for example, the handle hole 140.

Thus, the cleaning jig of the invention allows at least one LC container to be securely arranged so that effective cleaning processes may be performed.

A cleaning jig provided with first and second fixing means is capable of securing arranging multiple liquid crystal containers so that effective cleaning processes may be performed within a minimum period of time.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A cleaning jig, comprising:
    first fixing means including a plurality of first holes within which flanges are arranged, wherein the plurality of first holes have a first perimeter;
    a supporting die; and
    second fixing means rotatably coupled to the supporting die, wherein the second fixing means is moveable to a predetermined position over the first fixing means, wherein the second fixing means includes a plurality of second holes that are adapted to be arranged in correspondence with the plurality of first holes when the second fixing means is at the predetermined position and wherein the plurality of second holes have a second perimeter that is less than the first perimeter.

2. The cleaning jig according to claim 1, further comprising a handle formed in an upper portion of the supporting die.

3. The cleaning jig according to claim 1, wherein the flanges are capable of contacting a portion of a liquid crystal container.

4. The cleaning jig according to claim 1, wherein the plurality of second holes is capable of receiving a portion of a liquid crystal container.

5. The cleaning jig according to claim 1, wherein said second fixing means is rotatable in upward and downward directions.

6. The cleaning jig according to claim 1, wherein said first and second fixing means and said supporting die are made of stainless steel.

7. A cleaning jig comprising:
    first fixing means provided with a plurality of first holes within which flanges are arranged, wherein the plurality of first holes have a first perimeter;
    a supporting die;
    coupling means provided on the supporting die;
    second fixing means provided with a coupling part for coupling with the coupling means and arranged over the first fixing means, wherein the second fixing means and is rotatable in upward and downward directions, wherein the second fixing means includes a plurality of second holes that are adapted to be arranged in correspondence with the plurality of first holes when the second fixing means is rotated to a predetermined position and wherein the plurality of second holes have a second perimeter that is less than the first perimeter; and
    a handle formed at an upper portion of the supporting die.

8. The cleaning jig according to claim 7, wherein the flanges are capable of contacting a portion of a liquid crystal container.

9. The cleaning jig according to claim 8, wherein the plurality of second holes is capable of receiving a portion of a liquid crystal container.

10. The cleaning jig according to claim 8, wherein said first and second fixing means are made of stainless steel.

11. A cleaning jig for securing a container with first and second ends having different perimeters along an axis of the container, the cleaning jig comprising:
    a supporting die;
    a first fixing means for supporting the first end of a container, wherein the first fixing means includes an upper surface and a lower surface, at least one first hole intermediate the upper and lower surfaces and having a first perimeter for receiving the first end of the container and a flange arranged within the at least one hole and below the upper surface for contacting the first end of the container; and
    a second fixing means rotatably coupled to the supporting die over the first fixing means, wherein the second fixing means is adapted to receive the second end of the container, wherein the second fixing means includes at least one second hole having a second perimeter different from the first perimeter for receiving the second end of the container and wherein the first and second fixing means are separated by the supporting die.

12. The cleaning jig according to claim 11, further comprising a handle formed in an upper portion of the supporting die.

13. The cleaning jig according to claim 11, wherein the first fixing means includes a plurality of holes for receiving the first end of a container.

14. The cleaning jig according to claim 13, further comprising a plurality of flanges arranged within the plurality of first holes and below the upper surface, wherein the flanges are capable of contacting a portion of the container.

15. The cleaning jig according to claim 11, further comprising a coupling means provided at an upper portion of the supporting die for coupling with the second fixing means.

16. The cleaning jig according to claim 15, wherein the container is securely arranged within the supporting die when the second fixing means is coupled to the coupling means.

17. The cleaning jig according to claim 11, wherein the second fixing means is moveable to a predetermined position over the first fixing means.

18. The cleaning jig according to claim 17, wherein the second fixing means includes a plurality of second holes adapted to be arranged in correspondence with the plurality of first holes when the second fixing means is at the predetermined position.

19. The cleaning jig according to claim 18, wherein the plurality of second holes is capable of receiving the second end of the container.

* * * * *